United States Patent [19]

Shimomura et al.

[11] Patent Number: 4,492,211
[45] Date of Patent: Jan. 8, 1985

[54] AIR-TO-FUEL RATIO CONTROL SYSTEM FOR INTERNAL COMBUSTION ENGINE

[75] Inventors: Setsuhiro Shimomura; Yuuji Kishimoto, both of Hyogo, Japan

[73] Assignee: Mitsubishi Denki Kabushiki Kaisha, Tokyo, Japan

[21] Appl. No.: 409,226

[22] Filed: Aug. 18, 1982

[30] Foreign Application Priority Data

Aug. 19, 1981 [JP] Japan .................... 56-130763

[51] Int. Cl.³ .......................... F02D 5/02; F02D 9/02; F02M 25/06
[52] U.S. Cl. .................... 123/585; 123/494; 123/440
[58] Field of Search ............. 123/493, 327, 328, 585, 123/586, 440, 494

[56] References Cited

U.S. PATENT DOCUMENTS

| 4,015,568 | 4/1977 | Hariya et al. | 123/585 |
| 4,237,802 | 12/1980 | Fukuhara et al. | 123/585 |
| 4,385,596 | 5/1983 | Hosaka | 123/413 |
| 4,389,996 | 6/1983 | Yaegashi et al. | 123/585 |
| 4,393,843 | 7/1983 | Otsuka et al. | 123/440 |
| 4,416,241 | 11/1983 | Knapp et al. | 123/494 |

FOREIGN PATENT DOCUMENTS

| 2646695 | 4/1977 | Fed. Rep. of Germany | 123/585 |
| 53-0074617 | 3/1978 | Japan | 123/585 |
| 54-0113726 | 9/1979 | Japan | 123/585 |
| 55-0060636 | 5/1980 | Japan | 123/585 |
| 55-0148934 | 11/1980 | Japan | 123/585 |
| 2034930 | 6/1980 | United Kingdom | 123/585 |

Primary Examiner—Raymond A. Nelli
Attorney, Agent, or Firm—Sughrue, Mion, Zinn, Macpeak, and Seas

[57] ABSTRACT

An electric-type air-to-fuel ratio control system for an internal combustion engine in which the air-to-fuel ratio sucked into the cylinders of the engine is maintained substantially constant following abrupt deceleration. In accordance with the invention, a bypass flow of air is provided into the intake manifold of the engine downstream of the throttle valve and a fuel injection valve using an electrically controlled air supplying device. The air supplying device is opened following closure of the throttle valve to supply an additional flow of air which compensates for overrichness in the air-to-fuel mixture caused by the delay of fuel injected from the fuel injection valve to the cylinders of the engine. Preferably, the time during which air is supplied through the air supplying device and the flow rate of air therethrough is adjusted so as to maintain a predetermined air-to-fuel ratio following deceleration.

2 Claims, 3 Drawing Figures

AIR-TO-FUEL RATIO CONTROL SYSTEM FOR INTERNAL COMBUSTION ENGINE

BACKGROUND OF THE INVENTION

The present invention relates to an air-to-fuel ratio control system for an internal combustion engine. More specifically, the invention relates to an electric-type air-to-fuel ratio control system for an internal combustion engine which is equipped with a device for electrically controlling the supply of air to the engine during times of deceleration.

In one prior art air-to-fuel ratio control system, each cylinder is provided with an injection valve which is electrically driven in accordance with the flow rate of intake air to the engine. In such a system, however, the operating condition of the engine can easily be adversely affected due to differences in the air-to-fuel ratio among various ones of these cylinders. Differences in the air-to-fuel ratio among the cylinders can also cause the constituency of the exhaust gas to fall outside of allowable air pollution standards. Moreover, if a negative feedback control system is used to control the driving (open) times of the fuel injection valve provided for each cylinder, unless separate air-to-fuel ratio detectors are provided for each cylinder at positions upstream of the merging point of the exhaust manifold, it is impossible to effect the feedback control with a high degree of precision. Also, in order to maintain the air-to-fuel ratio as constant as possible among the cylinders, the fuel injection valves must as nearly as possible be identical in injection characteristics. To construct fuel injection valves having the requisite highly accurate characteristics is expensive.

In another type of known air-to-fuel ratio control system, a single injection valve is provided upstream of the branching point of the intake manifold of the engine in order to eliminate the above described drawbacks accompanying the multi-injection valve type control system. In this type of system, the relatively long distance between the fuel injection valve and the intake valves of the cylinders causes a delay from the time that fuel is injected until it arrives in the cylinders due to the fact that the injected fuel is in a liquid state and hence moves at a slower speed than the intake air. Because of this delay, the air-to-fuel ratio of the intake mixture into the cylinders may be far from what is desired when the speed of the engine is abruptly changed. For instance, if the accelerator is quickly released, the delay between the injection of the fuel and the time that it arrives in the cylinders causes the mixture arriving in the cylinders to be overly rich for a significant amount of time after the accelerator peddle is released. This leads to backfiring of the engine and abnormal shocks on the engine caused by excess amounts of fuel in the cylinders. Also, some of this excess fuel may not be burned so that hydrocarbons may be discharged in high concentrations in the exhaust gas.

It is a primary object of the present invention to eliminate the aforementioned problems inherent with the prior art air-to-fuel ratio control systems.

SUMMARY OF THE INVENTION

In accordance with the present invention, an electric-type air-to-fuel ratio control system for an internal combustion engine is provided in which air is supplied during deceleration of the engine at a flow rate corresponding to the quantity of fuel remaining in the intake manifold. This prevents the mixture sucked into the cylinders of the engine from being overly rich during times of deceleration.

BRIEF DESCRIPTION OF THE DRAWINGS

In the accompanying drawings.

DESCRIPTION OF THE PREFERRED EMBODIMENTS

Figure 1:
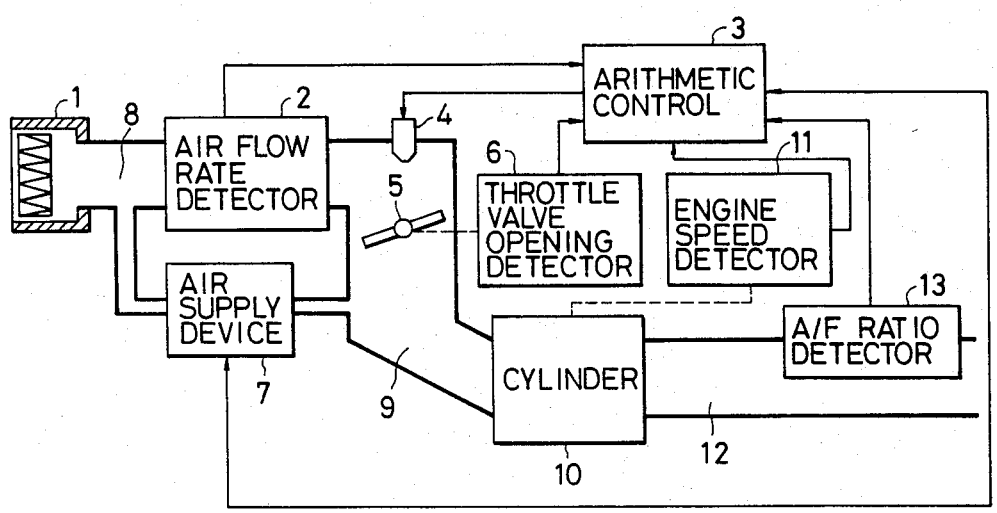
FIG. 1 is a block diagram showing essential portions of an electric-type air-to-fuel ratio control system for an internal combustion engine constructed in accordance with the teachings of the present invention.
Figure 2:
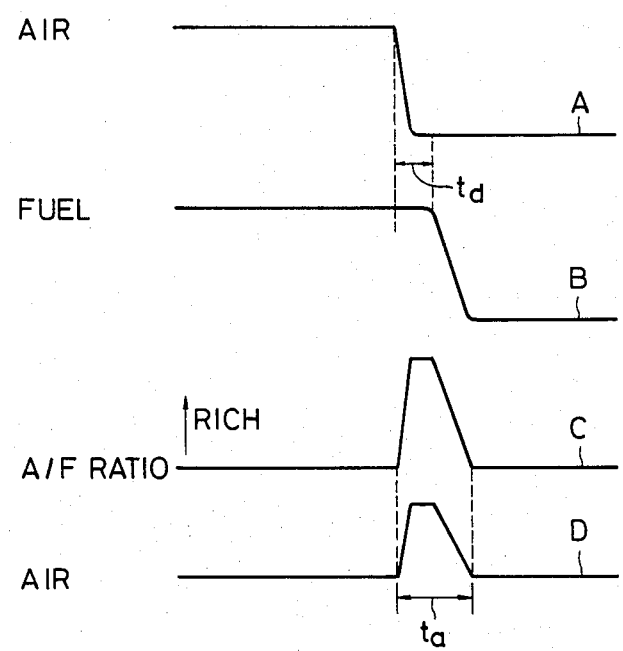
FIG. 2 is a waveform diagram utilized to explain the operation of the air-to-fuel ratio control system of FIG. 1

A preferred embodiment of an air-to-fuel ratio control system of the present invention will be described in detail with reference to FIGS. 1 and 2. FIG. 1 is a block diagram showing essential portions of an electric-type air-to-fuel ratio control device for an internal combustion engine of the invention. An arithmetic control device 3 receives inputs from an intake air flow rate detector 2 disposed downstream of an air cleaner 1 and the output of a detector 11 for detecting an engine speed in accordance with an ignition signal or a crank angle signal. In response to these signals, the arithmetic control device 3 controls a fuel rate supplying device, specifically, a fuel injection valve 4 such as an electromagnetic valve, so that the mixture fed to the engine has a desired predetermined air-to-fuel ratio. The arithmetic control device 3 also responds to the output of an air-to-fuel ratio detector 13 disposed in the exhaust manifold 12 of the engine for purposes of negative feedback control, whereby errors in the intake air flow rate detector 2, the engine speed detector 11 and the fuel injection valve 4 are compensated for.

In the above described system, the arithmetic control device 3 adjusts the flow rate of intake air to each cylinder 10 (with reference to the flow rate for the engine in its idle state) and the flow rate of injected fuel relative to the flow rate of the intake air so as to provide a predetermined air-to-fuel ratio and a predetermined time delay between the time of injection of the fuel and the time that it arrives in the corresponding cylinder 10. In this system, the quantity of residual fuel, that is, the amount of unburned fuel after the engine is abruptly decelerated, is determined by the speed of the engine, the flow rate of the intake air and the air-to-fuel ratio. If the accelerator, and hence a throttle valve 5, is abruptly changed in position from the fully open state to the partially opened state at a high speed so as to abruptly decelerate the engine, the flow rate of the intake air detected by the intake air flow rate detector 2 abruptly decreases, as shown by a curve A in FIG. 2. However, the flow of fuel into each cylinder 10 continues for a period of $t_d$ seconds, as indicated by a curve B in FIG. 2. Thus, (if the invention were not employed) the air-to-fuel ratio for each cylinder 10 becomes overly rich for a period of $t_a$ seconds, as shown by a curve C in FIG. 2. If the peak of the air-to-fuel ratio reaches a certain overly rich point, misfiring will occur, thereby instantaneously reducing the generated torque to zero. When the air-to-fuel ratio curve subsequently drops, ignition will be re-established, thereby generating an instantaneous high torque due to the richness of the air-to-fuel mixture and thereby generating intense shocks in the engine.

However, such misfiring and the subsequent generation of intense shocks to the engine are eliminated with the use of the invention. In accordance with the invention, a bypass is provided in the intake manifold of the engine around the portion of the intake manifold through which air passes the intake air flow rate detector 2. More specifically, an air supply device 7 such as an electromagnetic valve or an electrically driven valve is connected in a bypass arrangement between an upstream portion 8 and a downstream portion 9 (downstream of the throttle valve 5) of the engine. The air supplying device 7 is actuated for the aforementioned period of $t_a$ seconds, as shown by a curve D in FIG. 2. The additional flow of air provided by the air supplying device 7 compensates for the overrichness in the air-to-fuel ratio curve C so that the air-to-fuel ratio of the mixture sucked into the cylinder 10 is maintained substantially constant. As a result, the engine will not misfire due to overrichness of the air-to-fuel ration, and no intense shocks will be imposed on the engine.

In the air-to-fuel ratio control system of the invention, the air-to-fuel ratio of the mixture actually sucked into the cylinders of the engine is dependent only upon the engine speed before and after deceleration, the flow rate of the intake air, and the rate of deceleration. The arithmetic control device 3 controls the air supplying device 7 in response to outputs from the engine speed detector 11, the intake air flow rate detector 2, the air-to-fuel ratio detector 13 and a throttle valve opening detector 6 so as to supply air through the bypass at a rate determined in accordance with the quantity of residual fuel. As a result, not only misfiring due to overrichness of the air-to-fuel ratio, but also overleanness of the mixture are prevented. Moreover, the constituency of the exhaust gas is thereby maintained within allowable standards.

The arithmetic control device 3 will be described in more detail with reference to FIG. 3 which is a block diagram showing one preferred embodiment thereof.

Figure 3:
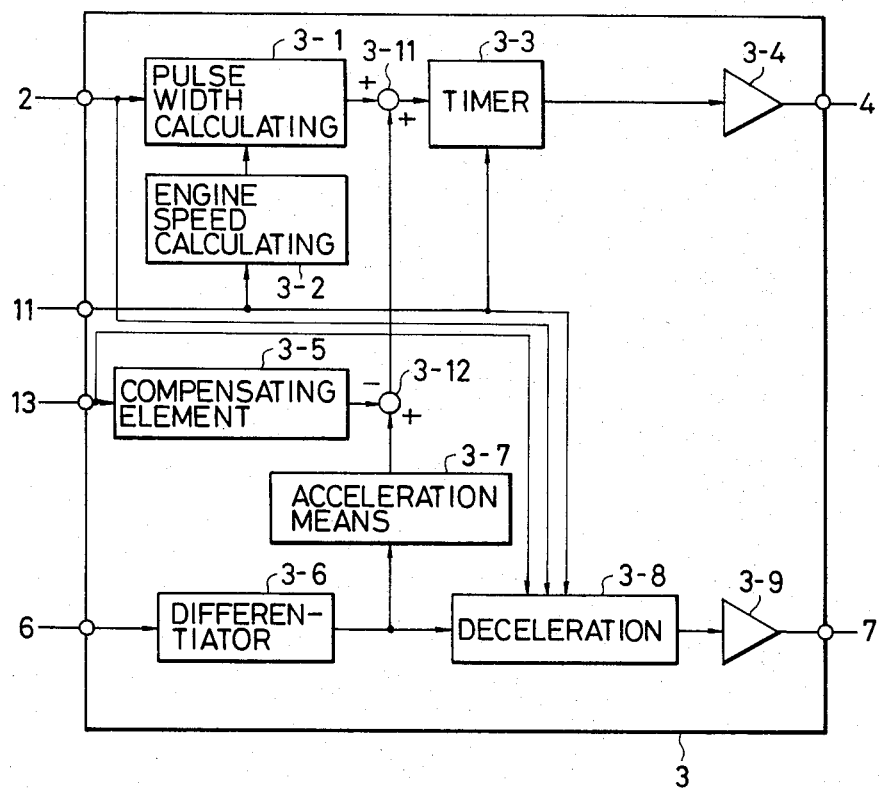
FIG. 3 is a block diagram showing a detailed circuit diagram of an arithmetic control device 3 shown in FIG. 1.

In FIG. 3, reference numeral 3-1 designates a pulse width calculating unit, connected to the output of the air flow rate detector 2, for calculating a drive pulse width of a signal which is applied to the fuel injection valve 4, 3-2 an engine speed calculating unit for calculating an engine speed in accordance with an engine speed signal from detector 11, 3-3 a timer unit for producing in synchronization with the engine speed signal a pulse signal having a pulse width corresponding to an output of the pulse width calculating unit 3-1, and 3-4 an amplifier for amplifying an output of the timer unit 3-3 to drive the fuel injection valve 4. In the pulse width calculating unit 3-1, a calculation operation $Q_A/N$ is carried out where $Q_A$ is an intake air rate and N is an engine speed (RPM) produced by the engine speed calculating unit 3-2, and the thus obtained $Q_A/N$ is applied to the timer unit 3-3. The timer unit 3-3 operates to output a pulse signal having a pulse width T ($=K \cdot Q_A/N$; K=constant) proportional to the output of the pulse width calculating unit 3-1, in synchronization with the rotation of the engine. The fuel injection valve 4 is controlled in accordance with the pulse signal so that a fuel mixture fed to the engine has a desired air-to-fuel ration. By changing the constant K, the air-to-fuel ratio is readily varied.

A compensating element 3-5, connected to the output of A/F ratio detector 13, is provided to achieve an appropriate negative feedback control operation, and is coupled to the timer unit 3-3 through adders 3-12 and 3-11. This compensating operation is well-known in the art.

Further, designated by reference numeral 3-6 is a differentiator for subjecting the output of the throttle valve opening detector 6 to differentiation to be applied to both an acceleration means 3-7 and a deceleration means 3-8. The output of the acceleration means 3-7 is a pulse width signal representative of an opening condition of the throttle valve 5 in acceleration. The output is added to the aforementioned pulse width signal T. This operation is also conventional.

The output of the differentiator 3-6 is also applied to the deceleration means 3-8 which operates to produce an output signal having a pulse width representing the operation condition of the throttle valve 5 during times of deceleration. This output signal is amplified by an amplifier 3-9 and then applied to the air supplying device 7. The electromagnetic valve contained in the air supplying device 7 is placed in an open state in response to the pulse width of the output signal so that a desired air flow passes therethrough.

As described hereinbefore, in accordance with the invention, a flow of air is provided through a bypass between an upstream portion of the intake manifold of the engine and a downstream portion of the intake manifold of the engine down stream of the throttle valve, bypassing the intake air flow rate detector, with the flow rate of this air being dependent upon the amount of residual fuel. As a result, the air-to-fuel ratio of the mixture actually sucked into each cylinder during times of deceleration is controlled to maintain a predetermined air-to-fuel ratio. Accordingly, because the air-to-fuel ratio is maintained at a proper value following abrupt deceleration, misfiring and intense shocks are avoided. Another advantageous effect of the invention is that, due to the elimination of excess hydrocarbons in the exhaust gas, the load imposed upon the catalytic converter of the engine is remarkably reduced. Thus, the amount of catalyst provided in the catalytic converter can be reduced and/or the service lifetime of the catalytic converter increased.

What is claimed is:

1. In an electric-type air-to-fuel ratio control system for an internal combustion engine including fuel flow rate adjusting means disposed upstream of a branch point in an intake manifold of the engine, an arithmetic control device for driving the fuel flow rate adjusting means in accordance with outputs of a plurality of sensing means for sensing predetermined operating parameters of said engine, and a throttle valve disposed in said intake manifold at a point downstream of said fuel flow rate adjusting means, the improvement comprising: bypass air supplying means for supplying air into said intake manifold at a point downstream of both said fuel flow rate adjusting means and said throttle valve, said air supplying means being actuated to supply air in response to at least one of the rate of closing of said throttle valve and changes in sensed operating parameters of said engine, said air supplying means being electrically controlled by said arithmetic control means; wherein a first one of said sensing means comprises intake air flow rate detecting means disposed in said intake manifold, and wherein said air supplying means is connected to bypass siad intake air flow rate detecting means.

2. The electric-type air-to-fuel ratio control system of claim 1, wherein a second one of said sensing means comprises an air-to-fuel ratio detecting means disposed in an exhaust manifold of said engine and a third one of said sensing means comprises means for detecting closing of said throttle valve, said air supplying means being opened in response to an output of said detecting means, and a flow rate of air through said supplying means being controlled in accordance with an output of said air-to-fuel ratio detecting means and an output of said input air flow rate detecting means.

* * * * *